Sept. 22, 1970          L. E. CONNER          3,530,348
SWITCHING CIRCUIT FOR INDUCTION MOTOR START WINDING
INCLUDING BILATERAL SWITCHING MEANS
Filed Aug. 15, 1968

INVENTOR
LEONARD E. CONNER

United States Patent Office 3,530,348
Patented Sept. 22, 1970

3,530,348
SWITCHING CIRCUIT FOR INDUCTION MOTOR START WINDING INCLUDING BILATERAL SWITCHING MEANS
Leonard E. Conner, St. Louis, Mo., assignor to Wagner Electric Corporation, Newark, N.J., a corporation of Delaware
Filed Aug. 15, 1968, Ser. No. 752,914
Int. Cl. H02p 1/44
U.S. Cl. 318—221                 7 Claims

ABSTRACT OF THE DISCLOSURE

A switching circuit for a motor including bilateral semi-conductor switching means connected in series with a starting winding of the motor, and control means including a triggering circuit coupled with the gating circuit of the switching means to trigger the same into conduction on each half cycle of the supply voltage to effect energization of the starting winding, the control means being responsive to the voltage induced in the starting winding to inactivate the triggering circuit and effect de-energization of the starting winding when the induced voltage therein increases to a predetermined value.

---

Figure 1:
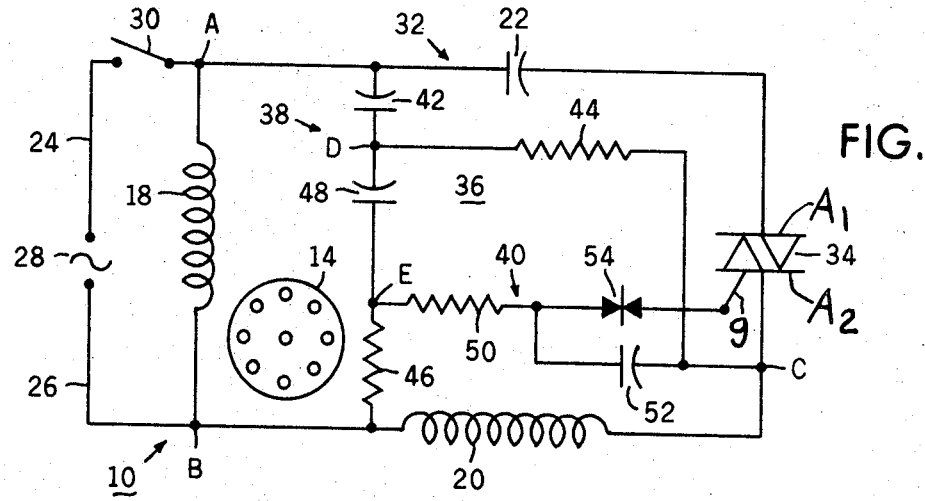

This invention relates to switching circuits and more particularly to a switching circuit especially well suited for use as a motor starting circuit.

In the past, electric motors, such as single-phase induction motors, were often provided with mechanical current interrupting devices such as switches and relays for de-energizing or disconnecting the starting winding when the rotor speed reached a predetermined value. Such switches were often actuated by centrifugal mechanisms connected to the motor shaft. Switching devices of that type had certain disadvantageous or undesirable features, for example, arcing between contacts, contact wear, fatigue of movable parts, large space requirement within the motor housing, etc. In some past arrangements, static switching devices were used; but these arrangements often had the undesirable or disadvantageous features of requiring additional windings, such as special signal windings or other devices disposed within the motor itself, or current transformers for disconnecting the starting winding at the desired motor speed.

The primary objects of the present invention are to provide novel circuit means which overcome the above-mentioned disadvantageous or undesirable features, and these, as well as other objects and advantageous features of the present invention, will become apparent hereinafter.

Briefly, in accordance with one form of the present invention, circuit means for an electric motor having running and starting windings are provided which include semi-conductor switching means for connection with the starting winding, the switching means having control electrode means associated therewith, and control circuit means including means coupled with the control electrode means for effecting conduction of the switching means and energization of the starting winding during the starting period of the motor and responsive to the induced voltage of the starting winding to effect de-energization of the starting winding when the induced voltage reaches a predetermined value.

Figure 2:
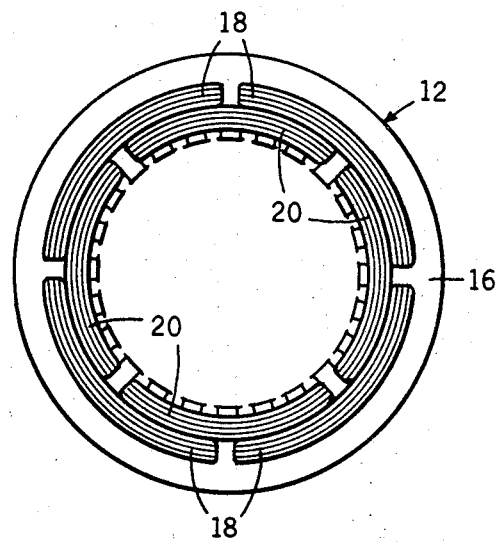
Figure 3:
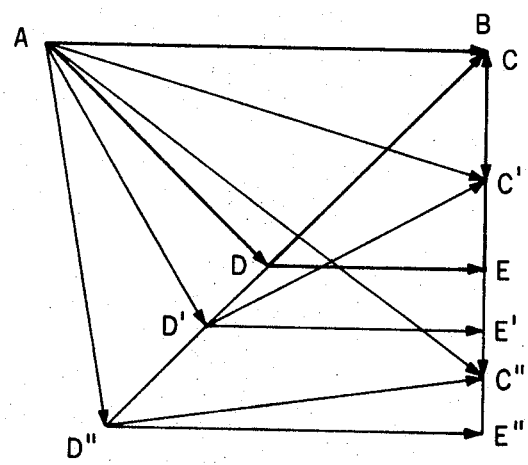

In the drawing which illustrates an embodiment of the invention,

FIG. 1 is a schematic circuit diagram of a motor circuit embodying the present invention, FIG. 2 is a diagrammatic end view of a stator containing the windings of FIG. 1, and FIG. 3 is a vector diagram of voltages appearing across various circuit points in the circuit of FIG. 1 at selected times during the starting period of the motor.

Referring now to FIGS. 1 and 2, there is shown a capacitor start type of single-phase induction motor 10 including a stator 12 and a rotor 14 adapted to be mounted for rotation relative to the stator 12. Stator 12 includes a magnetic core member 16 having a main or running winding 18 and an auxiliary or starting winding 20 physically angularly displaced from each other, for example by 90 electrical degrees, as illustrated in FIG. 2. Motor 10 is shown as a four-pole motor with a starting capacitor 22 connected in series with starting winding 20 to provide phase splitting or so that the currents in the starting and running windings differ in phase to provide starting torque. The rotor 14 is diagrammatically illustrated as of the squirrel cage type. Once a motor of this type reaches a predetermined speed or is close to its normal running speed, it is desirable to de-energize the starting winding 20.

In the circuit of FIG. 1, the running winding 18 is connected between a pair of circuit points or terminals A and B which are respectively connected by a pair of supply leads 24 and 26 to an alternating current power supply source 28 through a mechanical line switch 30 connected in lead 24. A series circuit, indicated generally at 32, including the starting capacitor 22, a bilateral semi-conductor switching device or static switch 34, and the starting winding 20, all connected in series with each other, is connected across terminals A and B between the supply leads 24 and 26.

The switch 34 is a well-known multi-layer bi-directional semi-conductor which is sometimes referred to as a triode-thyristor. Such switching devices as switch 34 are provided with an anode-one, $A_1$, an anode-two, $A_2$, and a gate electrode $g$. When a suitable signal voltage of relatively low value relative to the breakdown voltage value is applied to the gate electrode, the impedance between anodes $A_1$ and $A_2$ quickly drops to a very low value and remains low until such time as anode current substantially ceases to flow between the anodes. Once current ceases to flow or reaches a predetermined low value, the anode-one to anode-two impedance becomes very high. One such type of switching device is a "Triac" identified as GBS 410 E—Transitron Corp.

As will be explained in greater detail hereinafter, the conductivity of switch 34 is controlled by a control circuit indicated generally at 36 which includes a signal or control voltage producing network 38 and a triggering circuit 40 that is connected so as to be responsive to signal voltages produced by network 38. Triggering circuit 40 supplies triggering or gating signals or pulses to the gating circuit of switch 34 on each half cycle of the supply voltage during the starting period of the motor to fire switch 34 into conduction on each half cycle of the supply voltage and thereby supply alternating current to starting winding 20. The triggering circuit 40 becomes inactive when the voltage induced in the starting winding 20 increases to a predetermined value as a result of the rotor speed reaching a given value.

The signal or control voltage network 38 includes a phase-shifting capacitor 42 connected in series with a voltage dropping resistor 44 between terminal A and a circuit point or terminal C, located between starting winding 20 and switch 34. Network 38 also includes a voltage dropping resistor 46 connected in series with another phase-shifting capacitor 48 between terminal B and a circuit point or terminal D, located between the capacitor 42 and resistor 44.

The triggering circuit 40 includes a time constant or capacitor charging resistor 50 connected in series with a capacitor 52 between a circuit point or terminal E that is connected between resistor 46 and capacitor 48, and the terminal C. A switching device 54 shown as a bilateral conducting semiconductor sometimes referred to as a multi-layer avalanche or symmetrical switching silicon diode is connected in series with the gate-anode-two circuit of switch 34 across capacitor 52.

Such a switching device as device 54 blocks current flow for all voltages thereacross which are below a predetermined level or the designed breakdown voltage value thereof. When a voltage exceeding the designed breakdown value is applied, even for a very short period of time, the impedance thereof quickly drops to a very low value and remains low until such time as current substantially ceases to flow therethrough. Once current ceases to flow or reaches a predetermined low value, the switching device 54 again blocks current until a voltage exceeding the designed breakdown value is again impressed across it. One such type of device is identified as type ER-900—Transitron Electronics Corporation.

The triggering circuit 40 is connected to respond to voltages appearing between terminals C and E of the signal producing circuit 38. The values of resistor 50 and capacitor 52 are chosen to provide a suitable time constant whereby capacitor 52 is charged to the predetermined or designed breakdown voltage value of switching device 54 in a fraction of the time of a half cycle of the supply voltage during the starting period of the motor. Each time the voltage on capacitor 52 reaches the breakdown voltage value of device 54, the impedance of device 54 decreases to a low value and discharges capacitor 52 through the gate-anode-two circuit of switch 34. During the starting period of the motor 10, switching device 54 continues to charge and discharge capacitor 52 a plurality of times during each half cycle of the supply voltage, that is, a plurality of pulses are produced between the gate g and anode-two. One of these pulses triggers switch 34 into conduction on each half cycle of the supply voltage; and once switch 34 is conductive on a given half cycle, it remains conductive until the current from source 28 falls to zero or a predetermined low value. Since the triggering circuit 40 provides a signal pulse to fire the switch 34 into conduction on each half cycle of the supply voltage, alternating current flows in starting winding 20 during the starting period of the motor 10.

As long as the voltage between the circuit points C and E is at or above a predetermined value, triggering circuit 40 produces signal pulses maintaining starting winding 20 energized. When the voltage between circuit points C and E falls below the predetermined value, capacitor 52 can no longer charge to the breakdown voltage value of switch 54 and the triggering circuit becomes inactive as it no longer produces triggering pulses.

The voltage across circuit points C and E in the network 38 is proportional to the supply voltage and voltage induced in the starting winding 20. The induced voltage of starting winding 20 varies in accordance with the speed of the rotor 14. As the speed of rotor 14 increases from standstill, the induced voltage in starting winding 20 increases from zero, the induced voltage reaching a maximum when the rotor reaches its maximum speed of rotation. In the circuit of FIG. 1, the voltage between points C and E, as will be apparent from the following discussion, decreases as the speed of the rotor 14 increases. The voltage between points C and E falls below the predetermined value necessary to maintain the triggering circuit 40 active when the rotor 14 reaches that predetermined speed at which it is desired to de-energize the starting winding 20 or disconnect it from the source 28.

In discussing the operation of the motor circuit of FIG. 1, reference will be made also to FIG. 3 which shows voltage vectors that represent voltages measured between various pairs of circuit points in FIG. 1 at times when the static switch 34 is "off" or non-conductive during the starting period of the motor 10. Each voltage vector in FIG. 3 is identified by a pair of letters that also identify the corresponding pairs of circuit points in FIG. 1 across which the indicated voltage is measured.

When the line switch 30 is closed to start motor 10, but before the rotor 14 begins to rotate, the induced voltage in the starting winding 20 is zero and the circuit points B and C are at substantially the same potential, as is indicated in FIG. 3. The vector A–B represents the voltage of supply source 28; vector A–D represents the voltage across capacitor 42; vector D–C represents the voltage across resistor 44 which, at this time, is the same as the voltage across the series circuit including capacitor 48 and resistor 46 (vector D–B). The vector D–C is displaced 90 degrees from vector A–D which together equal vector A–B. The sum of the voltages across capacitor 48 and resistor 46, indicated by vectors D–E and E–C, respectively, is equal to the voltage between terminals D and B, as indicated by vector D–B (also D–C). Under these conditions, vector E–C is of a maximum value and the triggering circuit 40 connected between terminals E and C produces a signal pulse on each half cycle of the supply voltage to cause conduction of switch 34 and energization of starting winding 20.

As the speed of rotor 14 increases from zero to some intermediate speed, the voltage induced in the starting winding 20 increases from zero to some intermediate value such as the relative value indicated by vector C′–B in FIG. 3. At this time, the voltage vector A–C′ is shifted in phase from the supply voltage vector A–B because the induced voltage in starting winding 20 is 90 degrees out of phase with the supply voltage. The vector A–C′ is the sum of the voltage vectors A–D′ and D′–C′. The vector D′–B is the sum of the vectors D′–E′ and E′–B. The voltage between terminals E and C in FIG. 1 for the particular intermediate speed of rotor 14 is therefore represented in FIG. 3 as vector E′–C′. It is apparent from FIG. 3 that the vector E′–C′ is smaller than the original vector E–C at rotor standstill and that the voltage between terminals E and C has become smaller. It will be assumed herein that the voltage represented by vector E′–C′ is great enough to maintain the triggering circuit 40 active so that the starting winding 20 continues to be energized and the speed of rotor 14 increases.

As the speed of rotor 14 continues to increase, for example to the speed at which it is desired to de-energize or disconnect the starting winding 20, the induced voltage in winding 20 rises to a predetermined value, such as indicated by vector C″–B. Under these conditions, the voltage vector A–C″ is further phase displaced from the supply voltage vector A–B. The voltages across the capacitors 42 and 48 and resistors 44 and 46 are indicated respectively by vectors A–D″, D″–E″, D″–C″, and E″–B. The voltage between circuit points E and C, at this time, is indicated by vector E″–C″ and will be assumed herein to be below the predetermined value necessary to charge capacitor 52 to the predetermined breakdown voltage value of switching device 54. The voltage between points E and C is therefore too low to maintain the triggering circuit 40 active. Thus, the switch 34 is "turned off" or becomes non-conductive and remains non-conductive to de-energize the starting winding 20 so that the motor 10 now runs on only the running winding 18. As long as the motor runs within normal running speeds, the switch 34 is maintained non-conductive as the voltage between terminals E and C is maintained below the value necessary to charge capacitor 52 to the breakdown voltage value of switching device 54.

Should the speed of the rotor 14 fall below a predetermined speed, due for example to an overload condition, the voltage between circuit points E and C will increase to activate the triggering circuit 40 to effect conduction of switch 34 and energization of starting winding 20 on each half cycle of the supply voltage.

The relative values of the circuit components can be selected in accordance with the relative magnitudes of the voltage vectors of FIG. 3. The capacitor 42 and resistor 44 are chosen such that negligible current flows in starting winding 20 when static switch 34 is non-conductive. In one example case, the values of capacitor 42 and resistor 44 were selected to have approximately the same impedance ratio as the turns ratio of the main winding turns to the auxiliary winding turns, and the values of capacitor 48 and resistor 46 were selected to have the approximate impedance ratio as capacitor 42 and resistor 44, the reactance of capacitor 48 having about five times the reactance of capacitor 42. The number of turns of the running and starting windings in the above example case were about equal.

It will be apparent that the voltage between circuit points E and B increases with the speed of rotor 14 but at a lower rate than the starting winding induced voltage between circuit points C and B, as is indicated in FIG. 3 by the relative changes in the corresponding voltage vectors. The vector sum (difference of the magnitudes) of the voltages appearing across points E and B, and C and B, that is, the voltage across circuit points E and C, therefore decreases as the speed of rotor 14 increases. When the voltage between points E and C reaches a predeterminately low value, capacitor 52 can no longer charge to the breakdown value of switch 54, thus the switch 34 becomes non-conductive. The network 38, which includes impedances conductively connected across the starting winding 20, such as resistor 46, capacitor 48, and resistor 44, provides a simple and efficient arrangement by which the starting winding is de-energized at the desired rotor speed.

The embodiments of the invention in which an exclusive property or privilege is claimed are defined as follows:

1. In combination, an induction motor including a rotor, and a stator having a running winding and a starting winding physically displaced from said running winding, a series circuit including bilateral semiconductor switching means and said starting winding in series circuit relation, means for connecting alternating current voltage supply means across said running winding and said series circuit, said switching means having gate electrode means for effecting conduction of said switching means in response to a gating pulse applied thereto, a signal producing network including a first circuit including a plurality of impedances connected in series with each other across said series circuit and providing first and second circuit points with at least one of said impedances therebetween, and impedance means connected between said first circuit point and a third circuit point located between said starting winding and said switching means, and a triggering circuit including resistance means and capacitance means connected in series between said second circuit point and said third circuit point, and semiconductor switch means connected between said gate electrode means and a fourth circuit point located between said resistance means and said capacitance means for discharging said capacitance means when the capacitance means is charged to a predetermined value to produce a gating pulse at said electrode means to effect conduction of said switching means on opposite half cycles of the supply voltage during the starting period of the motor.

2. The combination according to claim 1, wherein said impedances include resistance means and reactance means.

3. The combination according to claim 2, wherein said semiconductor switch means comprises a bilateral conducting device.

4. The combination according to claim 1, wherein said series circuit includes a capacitor in series with said switching means and said starting winding.

5. In combination, a pair of input terminals for connection to an alternating current voltage supply source, a single phase induction motor including a rotor, and a stator having a running winding connected between said input terminals and a starting winding angularly displaced from said running winding, a series circuit including a bilateral semiconductor device and said starting winding connected in series with each other between said input terminals, said semiconductor device having a gate electrode, circuit means for deriving a signal responsive to the speed of said rotor and which decreases in magnitude from a relatively high value to a relatively low value as the speed of said rotor increases from standstill to a predetermined speed, said circuit means including a plurality of impedances including resistance and reactance means connected between said input terminals across said series circuit and providing first and second circuit points between different pairs of said impedances, impedance means connected between said first circuit point and a third circuit point between said switching means and said starting winding to provide said signal voltage between said second and third circuit points, and a triggering circuit connected to be responsive to said signal voltage when above a predetermined value to supply a gating pulse to said gate electrode to effect conduction of said switching device on each half cycle of the supply voltage, said triggering circuit including circuit means connected between said second and third circuit points and said circuit means of said triggering circuit including resistance means and a capacitor connected in series, said triggering circuit further including a bilateral semiconductor switch connected between another circuit point located between said resistance means and said capacitor, and said gate electrode.

6. In combination, a single phase induction motor including a squirrel cage type rotor, a stator having running and starting windings displaced angularly from each other, a pair of input terminals for connection to an alternating current voltage supply source, a first series circuit including a multi-layer bilateral semiconductor switch and said starting winding connected in series with each other between said terminals, said switch having a gate electrode, means connecting said running winding between said terminals, a second series circuit including a pair of capacitance means, and first resistance means connected in series with each other between said terminals and in parallel with said running winding and said first series circuit, second resistance means connected between a first circuit point located between said capacitors and a second circuit point located between said switch and said starting winding whereby the voltage between said second circuit point and a third circuit point located between one of said capacitors and said first resistance means decreases as the speed of said rotor increases during the starting period of the motor, third resistance means and other capacitance means connected in series between said second and third circuit points to effect charging of said other capacitance means through said second named resistance means, and bilateral semiconductor voltage breakdown switching means connected between a fourth circuit point located between said third resistance means and said gate electrode to discharge said other capacitance means through said gate electrode when the voltage on said other capacitance means reaches the breakdown voltage value of said switching means.

7. The combination according to claim 6, wherein said first series circuit includes a starting capacitor.

References Cited

UNITED STATES PATENTS 3,421,064    1/1969    Phillips _____ 318—221 XR
3,453,516    7/1969    Conner _____ 318—221

ORIS L. RADER, Primary Examiner

G. Z. RUBINSON, Assistant Examiner

U.S. Cl. X.R.

318—227